United States Patent [19]
Wahl et al.

[11] 3,853,103
[45] Dec. 10, 1974

[54] IGNITION TIMING CONTROL SYSTEM FOR INTERNAL COMBUSTION ENGINE IGNITION SYSTEMS

[75] Inventors: Josef Wahl, Stuttgart; Wolf Wessel, Schwieberdingen, both of Germany

[73] Assignee: Robert Bosch GmbH, Gerlingen-Schillerhohe, Germany

[22] Filed: Feb. 28, 1973

[21] Appl. No.: 336,823

[30] Foreign Application Priority Data
June 10, 1972 Germany.......................... 2228387

[52] U.S. Cl. ... 123/117 R, 123/146.5 A, 123/148 E
[51] Int. Cl. ............................................. F02p 5/08
[58] Field of Search ........ 123/117 R, 117 A, 148 E, 123/32 EA, 146.5 A

[56] References Cited
UNITED STATES PATENTS

| 3,454,871 | 7/1969 | Nolting | 123/117 R |
| 3,738,339 | 6/1973 | Huntzinger et al. | 123/117 R |
| 3,749,073 | 7/1973 | Asplund | 123/117 R |

*Primary Examiner*—Charles J. Myhre
*Assistant Examiner*—Cort Flint
*Attorney, Agent, or Firm*—Flynn & Frishauf

[57] ABSTRACT

A pulse generator provides a pulse train representative of angular position of the engine crankshaft, and a marker pulse, at a predetermined angular crankshaft position. A counter is connected to the train of pulses, to start counting upon occurrence of the marker pulses. A digital/analog converter converts the binary count numbers into an analog signal, which is compared with engine operation signals representative of spark advance or retardation, the comparator providing an output when the count derived from the counter and the operation parameter control signals match. The engine operation control signal may be a composite of signals commanding spark advance or spark retardation, such as speed signals, load signals or other operating parameter signals, applied to the comparator as varying voltages or currents.

17 Claims, 9 Drawing Figures

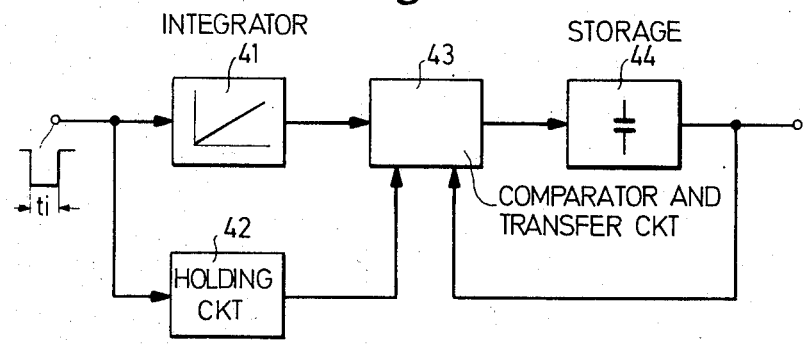
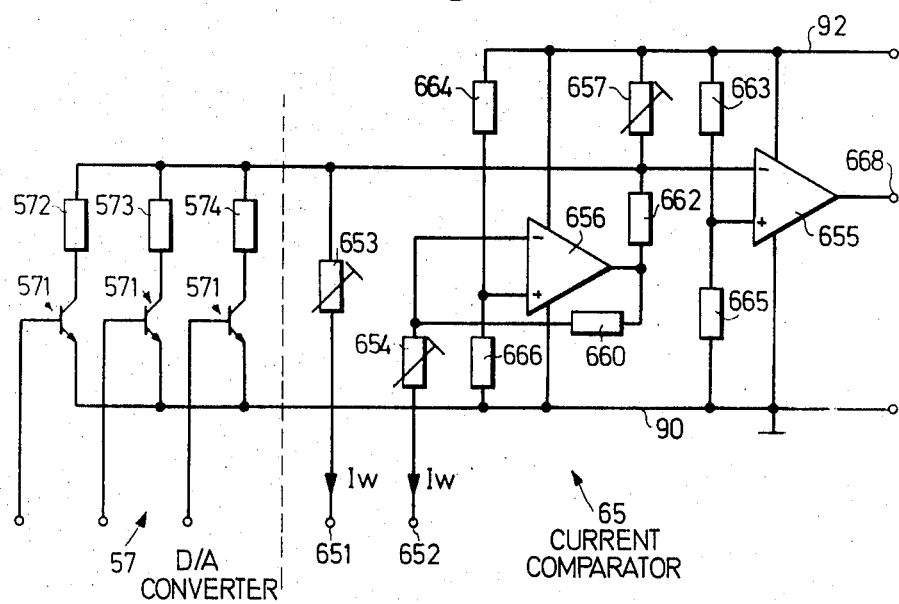

IGNITION TIMING CONTROL SYSTEM FOR INTERNAL COMBUSTION ENGINE IGNITION SYSTEMS

Cross reference to related U.S. Pat. No.: 3,483,851.

The present invention relates to an arrangement to control the ignition timing of the ignition system for internal combustion engines, and more particularly for single or multi-cylinder Otto-type internal combustion engines which are provided with a tachometer generator indicating the speed of the engine.

Tachometer generators are used with internal combustion engines and provide output pulses representative of engine speed, for example once for each revolution. These output pulses can be converted to various types of signals, for examples to d-c signals of varying amplitude, to a-c signals of varying frequency and amplitude and the like. These signals which include control parameters, the variation of which is representative of engine speed, are then utilized to control the ignition instant at which time an ignition pulse is provided to spark plugs for the internal combustion engines.

Various types of control arrangements to control the ignition instant, that is, the ignition timing with respect to engine crankshaft position have been provided. The ignition systems include inductive systems, capacitor discharge systems and the like, and the ignition timing is variable, by utilizing mechanical or pneumatical control apparatus to change the relative position of the ignition instant with respect to angular position of the crankshaft, and hence the position of the piston within the cylinder with respect to dead-center position of the piston in the cylinder. Mechanical and pneumatic control systems, including electro-mechanically and electro-pneumatically arranged systems have a disadvantage in that the accuracy of change in ignition timing is frequently low, and only a restricted number of control parameters can be introduced into the ignition timing adjustment system to vary the ignition timing. If it is desired to increase the number of control parameters which affect ignition timing, electronic ignition control systems are preferred.

One type of electronic control system utilizes a tachometer generator, preferably a contact-less transducer element which determines the angular position of the crankshaft of the internal combustion engine at any particular time. The output signals derived from the tachometer generator are provided to a control signal generator. Engine operating parameters, or engine ambient parameters are sensed by transducers which control a voltage source. The output voltages of the control generator and of the voltage source controlled by the outside parameters are then compared in a comparator. The output signal from the comparator is applied to an ignition control amplifier which, in turn, furnishes command signals which initiate the ignition pulses. The generator in accordance with this device includes a monostable multivibrator with a subsequently connected integrator. It has been found that such an arrangement may not have the desired accuracy for various applications. The exact angular position of the crankshaft, to determine the exact relative ignition instant, cannot be determined with sufficient accuracy since the capacitor, usually included in the integrator, is responsive to various externally randomly occurring noise or disturbance conditions. The monostable multivibrator included in the system, particularly when used in combination with a coil or transformer-type ignition system must be so designed that the pulse period is matched to the highest possible engine speed; in other words, the time during which the monostable multivibrator is in its unstable or metastable state is limited by the highest permissible design speed of the engine. As a result, at low engine speed, current will flow through the ignition coil for a comparatively long period of time, in order to permit the short interruption time, which causes undesired heating of the ignition coil, and high loading of the electrical supply circuit of the internal combustion engine, without providing any useful output.

It is an object of the present invention to provide an ignition system, particularly to control the ignition timing of an Otto-type internal combustion engine in dependence on any desired number of input parameters, such as ambient or operating parameters, for example engine speed, angular position of the crankshaft, loading of the crankshaft, temperature, air pressure, exhaust gas composition or the like, and which is not subject to the disadvantages of the prior art.

Subject matter of the present invention: Briefly, a binary counter is provided, connected to a digital-analog (D/A) converter, the output of which controls ignition timing.

In a preferred form, a first bistable multivibrator circuit is connected between a comparator and the ignition pulse amplifier, the comparator comparing commanded ignition timing with actual angular shaft position, to provide an output signal controlling the actual ignition timing and the start of an ignition pulse. A reset pulse is also provided to reset the counter and initiate a second count sequence, which is analyzed in a decoder, decoding the output from the binary counter and connected to reset the bistable multivibrator to terminate the ignition pulse.

Various types of transducers can be used in the system of the present invention to provide input signals representative of various input parameters. For example, a speed-voltage transducer, and a load-voltage transducer can be provided, the two transducers being connected to a summing amplifier, the output voltage of which is provided to the comparator. Rather than utilizing output voltages, currents can be controlled.

The invention will be described by way of example with reference to the accompanying drawings, wherein:

FIG. 7 is a schematic block diagram of a time-voltage converter, illustrating another embodiment of the load-voltage converter;

FIG. 9 is a fragmentary schematic diagram illustrating the circuit to control ignition timing by means of current comparison.

Figure 1:
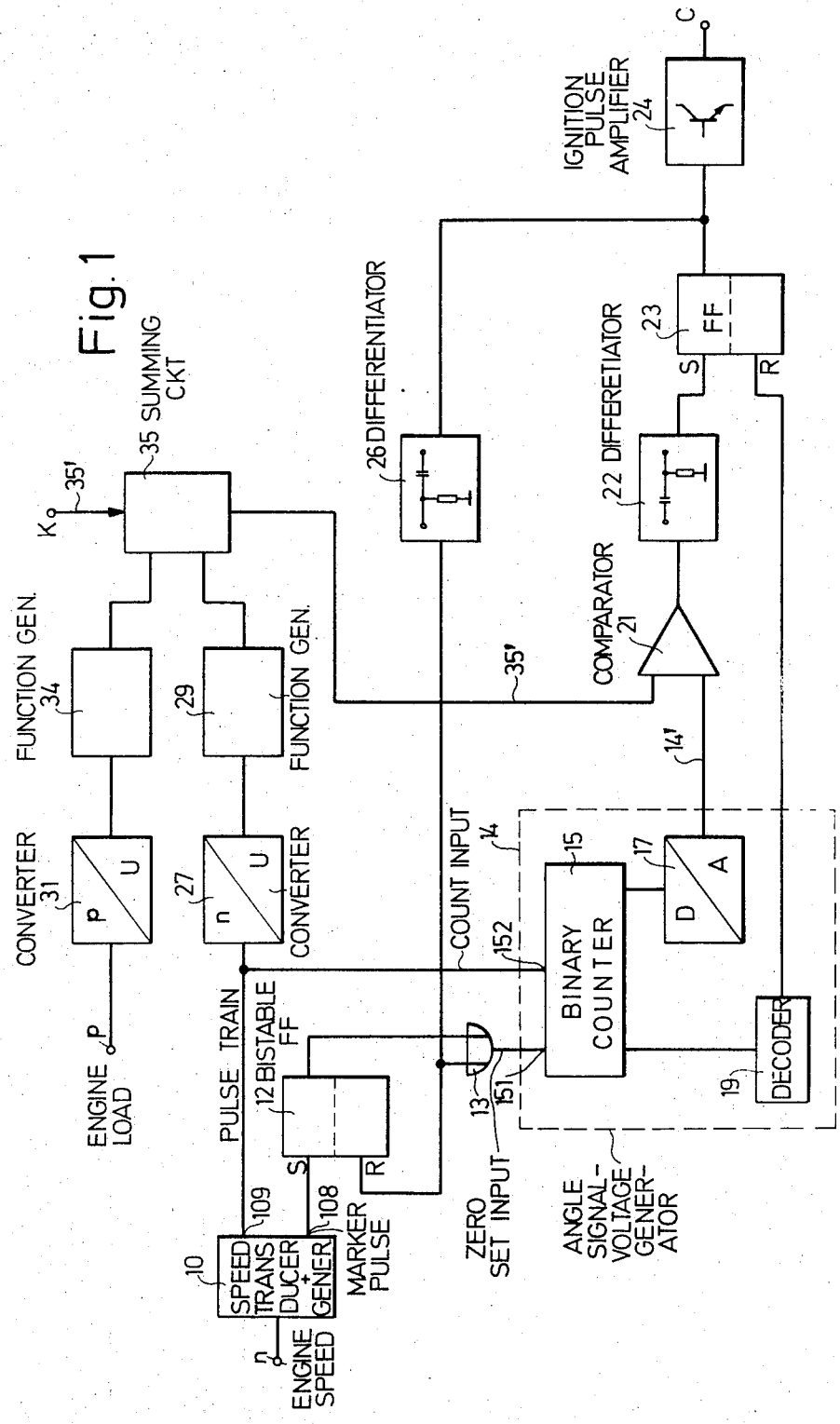
FIG. 1 is a schematic block diagram of a system in accordance with the present invention.

The basic circuit in accordance with the invention is illustrated in FIG. 1: A speed-electrical transducer 10 has two output terminals 108, 109, and is coupled with its input to the crankshaft, for example, or to the camshaft, or to another element rotating in synchronism with the speed of the engine, as schematically indicated by input n. Such transducers may operate on electro-dynamic, photo-electric, or electro-magnetic principles, synchronously controlled from the crankshaft of the engine (not shown). The first output 108 of transducer 10 is connected to the first input of a second bistable multivibrator or flip-flop (FF) 12. The output of bistable FF 12 is connected to the input of an OR-gate 13, the output of which is connected to a zero or reset input point 151 of a binary counter 15. The second output 109 of the transducer 10 is connected to the count input 152 of binary counter 115 and further to a speed-voltage converter 27. Binary counter 15 is connected at its output to a digital-analog (D/A) converter 17. A decoding network 19 can likewise be connected, in parallel, to the D/A converter 17. Binary counter 15, D/A converter 17 and decoder 19, if used, together form an angle signal-voltage generator 14. D/A converter 17 provides at its output a voltage proportional to angular position of the crankshaft of the internal combustion engine. It is connected to the first input of a comparator 21.

Comparator 21 compares input parameters, one of which being the angular position of the crankshaft of the engine, derived from generator 14, with a second value representative of engine operation, or ambient parameters. The second input of comparator 21 has applied thereto the output signal from a summing circuit 35 which is a signal having a function representative of change in ignition timing. Summing circuit 35 sums a signal representative of engine speed, derived from converter 27 and function generator 29 with a signal representative of engine loading, derived from an input signal converter 31 connected to a function generator 34. The converter 31 may, for example, be a pressure-voltage converter which senses the vacuum in the inlet manifold to the internal combustion engine, and thus provides a signal representative of loading of the internal combustion engine, to change the ignition timing in accordance therewith. Various other parameters may be added to the summing circuit 35, over suitable function generators, as schematically indicated by terminal k, connected to line 35'.

The output signal of comparator 21, comparing angular position of the crankshaft appearing on line 14' with summed adjustment signals appearing on line 35', is connected to a first differentiator 22 which provides output pulses to a first input of a first bistable FF 23. A second input of the first bistable FF 23 is connected to the decoder 19 or, if decoder 19 is not used, directly to the count output of binary counter 15. The first bistable FF 23 provides the ignition pulses at its output, which are connected to an ignition amplifier 24, as well as to a second differentiator 26. Ignition amplifier 24 triggers the ignition process when having a pulse applied thereto. The output of the second differentiator 26 is connected to the second input of OR-gate 13 and additionally to the second input, forming the reset input of the second bistable FF 12.

Operation: Each revolution of the crankshaft of the internal combustion engine provides at least one starting pulse, which marks a predetermined angular position of the engine crankshaft. This starting pulse triggers the second FF 12. The zero set input 151 of binary counter 15 is thus released, by transfer of the signal from FF 12 over OR-gate 13. The start pulse may occur, for example, at 60° in advance of the upper dead-center position of a piston within the cylinder, and provides a reference point - with respect to time - for the electronic change of the ignition timing instant with respect to angular crankshaft - and hence piston - position. The entire ignition timing change for the cylinder is then referred back to the instant at which this start pulse occurs. In a four-cylinder, four-cycle engine, one each ignition pulse must be obtained after each revolution of the crankshaft by 180°; 180° after the first ignition pulse is derived, a second pulse must then be provided by the engine speed transducer 10.

Besides the start pulses, output 109 of the speed transducer 10 provides a number of counting pulses. The number of counting output pulses is much greater than the number of the start impulses, and corresponds to engine speed. For example, counting pulses may be provided for each degree of rotation of the crankshaft. These counting pulses are applied to the counting or clock input 152 of binary counter 15, and are counted by the binary counter. By counting the counting pulses, the second, or any further start impulse can be simulated so that only one starting impulse for each crankshaft revolution is necessary to obtain a zero reference point for ignition timing.

The counting state of the digital counter 15 is transferred to the D/A converter 17, for example over a binary resistance chain or tree to provide a voltage proportional to angular crankshaft position, on line 14', for application to comparator 21. The line 35' connected to comparator 31 has a voltage applied thereto representative of changes in angular ignition timing. When the voltages to the input of comparator 21 are equal, an output signal is applied which triggers the first FF 23, and thus initiates an ignition pulse, and hence an ignition spark in the ignition circuit of the internal combustion engine, schematically indicated only as C. The ignition pulse derived from the first FF 23 is transferred in the second differentiator 26 into a sharp peaked or spike pulse, and applied to OR-gate 13, to reset the binary counter 15, which briefly resets the binary counter to zero. Binary counter 15 then continues to count the pulses applied by transducer 10. The new count sequence is evaluated by decoder 19, so that, when a previously determined counting state in counter 15 is reached, the first FF 23 is reset by the output signal of the decoder 19. The decoder 19 is not strictly necessary if predetermined and simple binary numbers arising in binary counter 15 can be utilized to reset the first FF 23. Reset of the first FF 23 also causes renewed resetting of binary counter 15. The reset pulse is differentiated in differentiator 26, resetting the second FF 12 which, in its reset position, provides a pulse to OR-gate 13 and to the zero set impulse 151 of binary counter 15 to set binary counter 15 again to zero, and holds the binary counter in zero count state until a new starting pulse is provided to the second FF 12, to set FF 12 and start a new counting cycle.

Binary counter 15 thus has two counting cycles corresponding to two counting functions. This dual function of counter 15 avoids the use of a second counter and associated logic circuits. It is not necessary that the end of the various ignition pulses is determined by a further control pulse which is generated additionally by the speed transducer 10, as in some systems in the prior art as discussed above. The transducer utilized in accordance with the present invention can thus be of the much simpler type, and hence less expensive.

Figure 2:
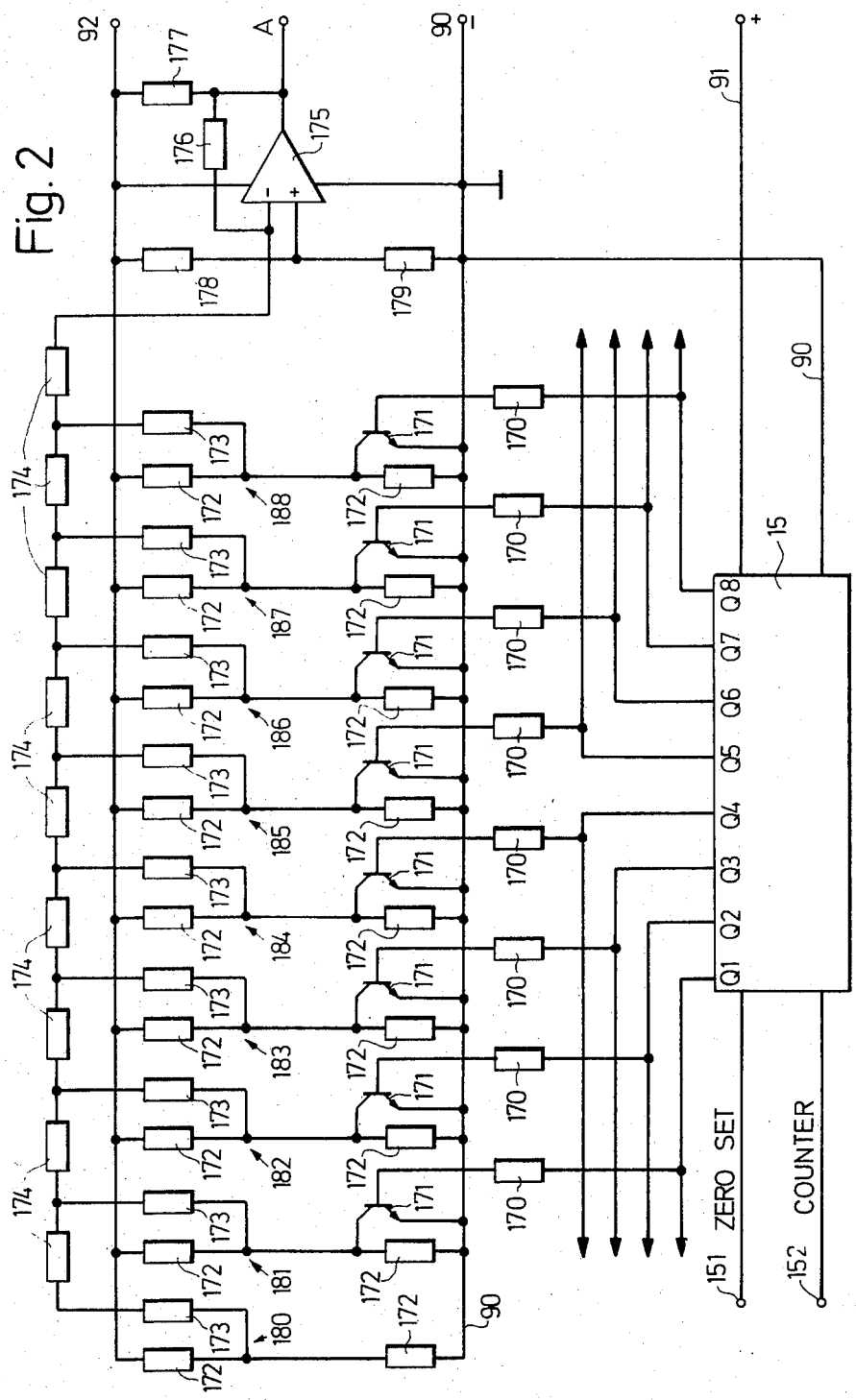
FIG. 2 is a schematic circuit diagram of a binary counter and a digital-analog (D/A) converter.

Referring now to FIG. 2: Counter 15 is an eight-bit binary counter which may be constructed of a pair of commercial four-bit binary counters. Binary counters 15 are connected to a supply line 91 and to a ground or chassis line 90. As described in connection with FIG. 1, a zero set input 151 and a count or clock input 152 is provided. It also has eight outputs Q1 to Q8. The outputs are connected, each, to a coupling resistor 170 and then to the D/A converter 17. They simultaneously provide count outputs to determine the firing angle, with respect to crankshaft rotation, that is, to determine ignition timing. Each one of the output resistors 170 is connected to the base of an associated npn switching transistor 171. The switching transistors 171 have eight voltage dividers 181-188 associated therewith, which are connected to a second supply line 92 and ground. The voltage dividers, as well as a further voltage divider 180 each consist of a pair of similar divider resistors 172. The collectors of the switching resistors 171 are connected each to the junction point between the resistors 172 of each of the voltage dividers 181 to 188. The emitters of switching transistors 171 are grounded to bus 90. Supply line 92 provides a regulated, that is, a controlled voltage. Each of the connection points of the junctions of all the voltage resistors 182, 188 are connected to a respective coupling resistor 173. The coupling resistors 173 are connected to a chain of nine series connected resistors, which together form the input resistance for an operational amplifier 135. The coupling resistor 173 which is connected to the junction of the resistors of the voltage divider 180, is connected in series with the first input resistor 174; all the remaining coupling resistors 173 are connected to the junction point between the series connected resistors 174. The operational amplifier 175 is connected as a proportional amplifier. The analog output A of the operational amplifier 175 is connected to an output resistor 177 which connects to the second, voltage controlled supply line 92; further, a feedback resistor 176 is connected to the inverting input of the operation amplifier 175, and thus to the input resistor chain formed of the resistors 174. The non-inverting input of operational amplifier 175 has a reference voltage applied thereto, determined by the voltage division ratio of a pair of resistors 178, 179, by being connected to the junction point of the two resistors which, in turn, are connected between the regulated supply line 92 and chassis line 90.

Figure 3:
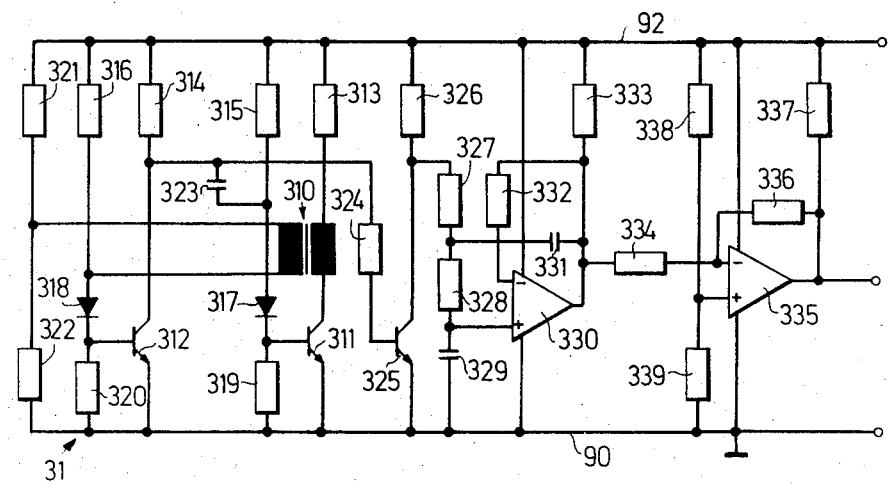
FIG. 3 is a schematic diagram for a load-voltage converter.

One of the operating parameters which can be used to control spark timing is engine load. A representative value of engine load is the pressure, or rather, the vacuum, in the inlet manifold to the engine. FIG. 3 illustrates a pressure sensing device which includes an inductive transducer 310, which includes a core which is movable and connected to a pressure diaphragm, in a chamber. The diaphragm chamber is connected to the inlet manifold of the internal combustion engine. The diaphragm chamber and the inlet manifold have been omitted from the drawing for simplicity. The inductive transducer 310 is in the feedback circuit of a monostable multivibrator which includes two npn transistors 311, 312 as amplifiers. One winding of the inductive transducer 310 is connected, in series, with collector resistor 313 connected in the collector circuit of npn transistor 311. The other winding is connected, on the one hand, to the base of the other npn transistor, over a diode 318 and to a voltage divider formed of resistors 321, 322. The base-voltage divider of npn transistor 312 is formed by a resistor 316, the diode 318 and the further resistor 320. Resistor 316, like resistor 321 and collector resistor 313 are connected to the regulated supply line 92. The other terminals of resistors 321 and 316, respectively, are connected to the two terminals of the transducer 310, and to the other terminal of resistor 322, and the anode of diode 318, respectively.

Resistor 320 is connected to the cathode of the diode 318, to the base of transistor 312 on the one hand and, on the other, to the chassis bus 90.

The emitter of the two transistors 311, 312, respectively, is each connected to the chassis bus 90. The collector of npn transistor 312 is connected over collector resistor 314 to supply line 92 and forms one of the outputs of the monostable MV: it is further connected to a capacitor 323 forming a feedback capacitor of the astable MV, which is connected in turn to the base voltage divider of npn transistor 311. The base voltage divider of transistor 311 is similarly constructed to the base voltage divider of transistor 312; it includes a resistor 315 connected on the one hand to bus 92 and on the other to capacitor 323 and the anode of a diode 317, and a resistor 319 connected to chassis bus 90 and to the cathode of diode 317 and the base of the transistor 311. The feedback element, capacitor 323, is connected to the anode of the diode 317; with respect to transistor 312, the feedback element, namely the feedback winding of inductance 310, is connected to the anode of diode 318.

The collector of npn transistor 312 forms the output of the monostable MV, and is additionally connected over resistor 324 to the base of an npn transistor 325. The emitter of transistor 325 is connected directly to chassis bus 90; the collector is connected over collector resistor 326 to the stabilized supply line 92. The collector 326 is additionally connected to an RC network 327, 328, 329, 331, 332, 333; the RC network connects to a first operational amplifier 330. The network including the elements 327 to 333 operates as a low pass filter. The non-inverting input of operational amplifier 330 is coupled to the collector of transistor 325 by the series connection of the resistors 328, 327, and to chassis over capacitor 329. The output of operational amplifier 330, which forms likewise the output of the low pass filter, is coupled over a feedback capacitor 331 to the junction point of the resistors 327, 328 and additionally over a feedback resistor 332 to the inverting input of operational amplifier 330. The output of operational amplifier 330 is further connected over an output resistor 333 to stabilized supply line 92. The output of operational amplifier 330 is connected over coupling resistor 334 with the inverting input of a second operational amplifier 335. The non-inverting input of operational amplifier 335 has a reference voltage applied thereto, by being connected to the tap point of a voltage divider formed of resistors 338, 339 connected between buses 92 and 90. The output of the second operational amplifier 335, which forms the output of the pressure voltage divider 31, is connected over a feedback resistor 336 to the inverting input of the second operational amplifier 335. The output of operational amplifier 335 is additionally connected to positive bus 92 over resistor 337.

The speed-voltage converter 27 may be constructed, as known, by using a monostable FF with a low pass filter, in series. The voltage which is thus obtained, as well as the voltage derived from transducer 31 (FIG. 3) is transformed in a first function generator 29, and a second function generator 34, respectively (FIG. 1). Both function generators may, in principle, be constructed similarly.

Figure 4:
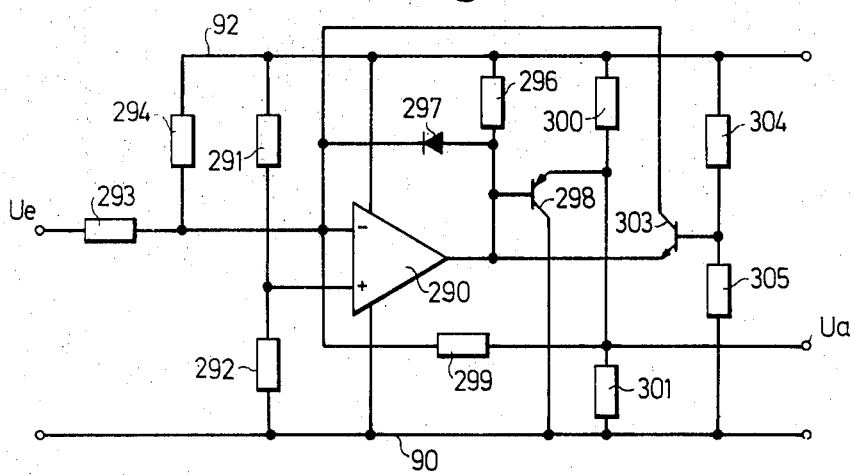
FIG. 4 is a schematic circuit diagram of a function generator.
Figure 5:
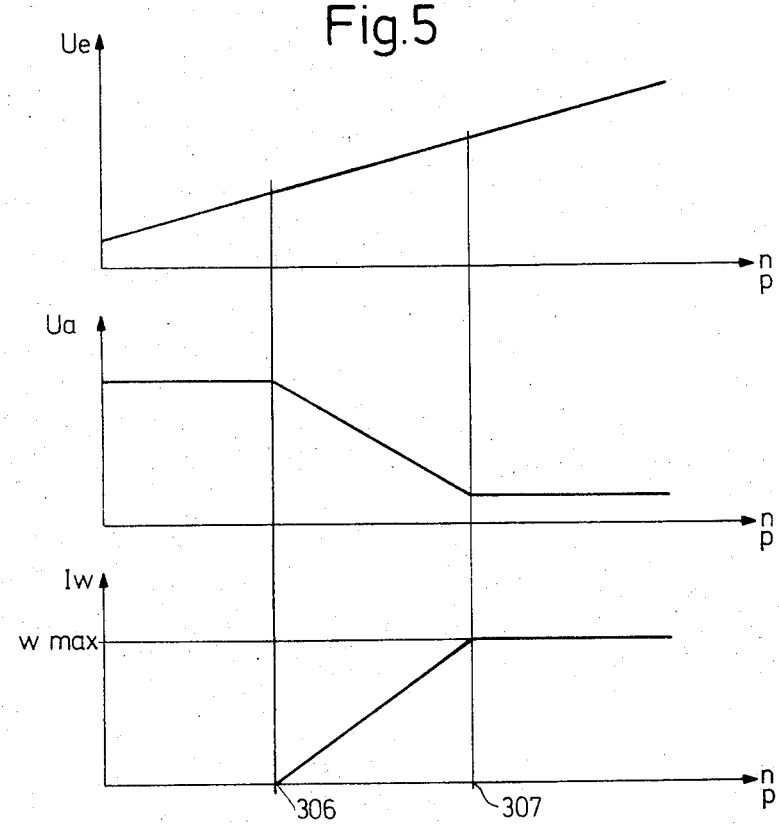
FIG. 5 is a series of graphs indicating the transfer function of the function generator of FIG. 4.

FIG. 4 illustrates the construction of the first function generator 29; FIG. 5 illustrates characteristic transfer functions.

An input voltage Ue, for example the output voltage of generator 31, or another transducer, is applied to input coupling resistor 293. Input resistor 293 is coupled to the inverting input of operational amplifier 290. A bias voltage is applied to the resistor 292 by connection of resistor 294, which has its other end connected to stabilized supply line 92. The non-inverting input of operational amplifier 290 has a reference voltage applied thereto by connection to the tap point of a voltage divider formed of resistors 291, 292, connected between the supply line 92 and chassis bus 90. The output of operational amplifier 290 is connected to the anode of a feedback diode 297, and to the base of a pnp transistor 298. Output resistor 296 additionally connects the output to bus 92. The output is additionally connected to the emitter of an npn feedback resistor 303. The cathode of feedback diode 297, and the collector of npn feedback transistor 303 are both connected to the inverting input of the operational amplifier 290. The emitter of pnp transistor 298 has a reference voltage applied thereto, by being connected to the tap point of the voltage divider formed of resistors 300, 301, connected between buses 92, 90. The tap point is further connected over a feedback resistor 299, which is preferably adjustable, to the inverting input of operational amplifier 290. The collector of pnp transistor 298 is connected to chassis bus 90. The emitter pnp transistor 298, and thus the tap point of voltage divider 300, 301 forms the output of the function generator, that is, the terminal at which an output voltage Ua is available. The base of the npn feedback transistor 303 is connected to a base voltage divider formed of resistors 304, 305 connected between buses 92, 90. A further voltage divider formed of resistors 291, 292 is connected between buses 92, 90, the tap point of which is connected to the non-inverting input of operational amplifier 290.

Operation of function generator in accordance with FIG. 4 (with reference to graphs of FIG. 5): The voltage applied at the input terminal, that is, to resistor 293 is shown in the first graph of FIG. 5. This voltage may be proportional to speed of the crankshaft of the engine, pressure in the inlet manifold to the engine, or any other engine operation, operating, or ambient or resulting parameter. If this voltage Ue is below a certain threshold, determined by the setting of resistor 294, then the anode of the feedback diode 297 will be brought, by the action of the operational amplifier 290, to such a potential that the voltage drop across the anode 297 is higher than the voltage taken off the tap point of voltage divider 291, 292, connected to the non-inverting input of the operational amplifier. When the resistances of the resistors 291 and 300 and the resistances of resistors 292 and 301 are equal, then the emitter of the pnp transistor 298 will have the same voltage as the non-inverting input of operational amplifier 290. Since the base of pnp transistor 298 will be more positive, pnp transistor 298 will block.

When voltage Ue reaches the value indicated in the graphs of FIG. 5 at 306, determined by the threshold set by resistor 294, then operational amplifier 290 will decrease the base voltage of the pnp transistor 298 until it becomes conductive, and the tap point of the voltage divider 300, 301, from which also the output voltage is taken, will shift in direction of the voltage of ground or chassis bus 90. As soon as the output voltage Ua becomes more negative than the voltage of the resistor 292, and thus more negative than the non-inverting input of operational amplifier 290, then the amplification feedback of the operational amplifier will become effective by action of feedback of the feedback resistor 299. Depending on the resistance of the feedback resistor 292 - which is preferably adjustable - a change in input voltage Ue will provide either little or strong change in the output voltage Ua, which will lead later, or sooner, to the point 307 which determines the final output value of the output voltage Ua. The output voltage Ua is illustrated in the second graph of FIG. 5, with respect to change in the input parameter. The final value of the output voltage Ua beyond the value 307 is fixed by the voltage division ratio of the base voltage divider 304, 305 and the npn feedback transistor 303. The final value of the output voltage Ua does not change, even if there is further change of input voltage Ue, as can readily be seen by a comparison of the first and second graphs of FIG. 5.

Figure 6:
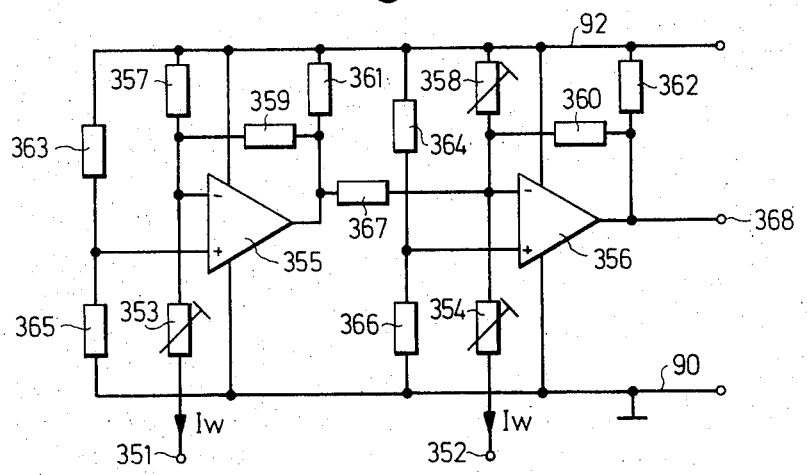
FIG. 6 is a schematic circuit diagram of a summing circuit to provide an output signal to change ignition timing.

Referring now to FIG. 6, which illustrates a circuit diagram for a summing circuit 35 (FIG. 1) which provides an output signal controlling ignition timing. The summing circuit has two inputs 351, 352. One input is provided for parameters which cause spark advance; the second input 352 is provided for parameters which are to cause spark delay or retardation. The two inputs 351, 352 each are connected to the output of a function generator, as previously described. The summing circuit has, as its central unit, two operational amplifiers 355, 356, the inverting terminals of which are formed as summing terminals. The inverting terminal of the first operational amplifier 355 is connected to a first input resistor 353 which connects to the first input 351, forming the output terminal of a function generator. The inverting input of the second operational amplifier 356 is connected to a second input resistor 354, the other terminal of which forms the second input 352. Supply line 92 is connected by resistor 357 to the inverting input of operational amplifier 355. Resistor 358 connects the inverting input of operational amplifier 356 to bus 92. Preferably, resistor 358 is variable. The output signal of the first operational amplifier 355 is connected to feedback resistor 259 and back to the inverting terminal thereof; the output signal of the second operational amplifier 356 is fed back over resistor 360 the inverting input thereof. The non-inverting input of first operational amplifier 355 is connected to a reference potential available at the tap point of a voltage divider formed of resistors 363, 365. The non-inverting input of the second operational amplifier 356 is connected to the tap point of a voltage divider formed of resistors 364, 366. The voltage divider 363, 365 and voltage divider 364, 366, each, are connected between the two buses 92, 90. The output of the first operational amplifier 355 is coupled by means of output resistor 361 with bus 92, and over a coupling resistor 367 to the inverting input of the second operational amplifier 356. The output of the second operational amplifier 356, which forms also the output of summing circuit 35, is connected over output resistor 362 to bus 92.

All the operational amplifiers discussed in connection with FIGS. 2, 3, 4 and 6 are supplied from supply lines 92 and 90.

Operation of circuit of FIG. 6, and with reference to FIG. 5: If both inputs 351, 352 have any random voltage applied thereto, that is, when both inputs are in idle condition, then the output of the first operational amplifier 355, due to connection of the inverting input with the resistor 357, and the feedback resistor 359, provides a low potential. Coupling resistor 367 and the second feedback resistor 368, as well as coupling resistor 358, which preferably is adjustable, together will then provide a network with the operational amplifier 356 so that the output of the summing circuit 35 can be set to provide a desired base or reference value. Adjustment of this value is determined by adjusting the relative resistance values of resistors 358 and 354. If the first input 351 is connected to a function generator in accordance with FIG. 4, current will be supplied over input resistor 353, as indicated in the third graph of FIG. 5. The output voltage of the first operational amplifier 355, that is, current Iw is compensated by the feedback resistor 359. The increased output voltage of the first operational amplifier 355 causes a drop at the output of the second operational amplifier 356 and with it at the output 368 of summing circuit 35. Voltage drop at the output 368 represents spark advance. If the second input of summing circuit 35 is connected to a function generator, for example in accordance with FIG. 4, a current Iw in accordance with the third graph of FIG. 5 will be caused, and the output 368 of summing circuit 35, and with it of the second operational amplifier will increase in order to compensate current Iw. Increase in voltage at the output 368 represents spark retardation.

The inverting inputs of operational amplifiers 355, 356 may have additional input resistors, in any desired number, connected thereto, to which additional function generators, such as function generators described in connection with FIG. 4 can be connected, if additional input parameters are to be used to control the ignition timing, that is, the instant of an ignition spark with respect to piston, or angular crankshaft position.

Figure 8:
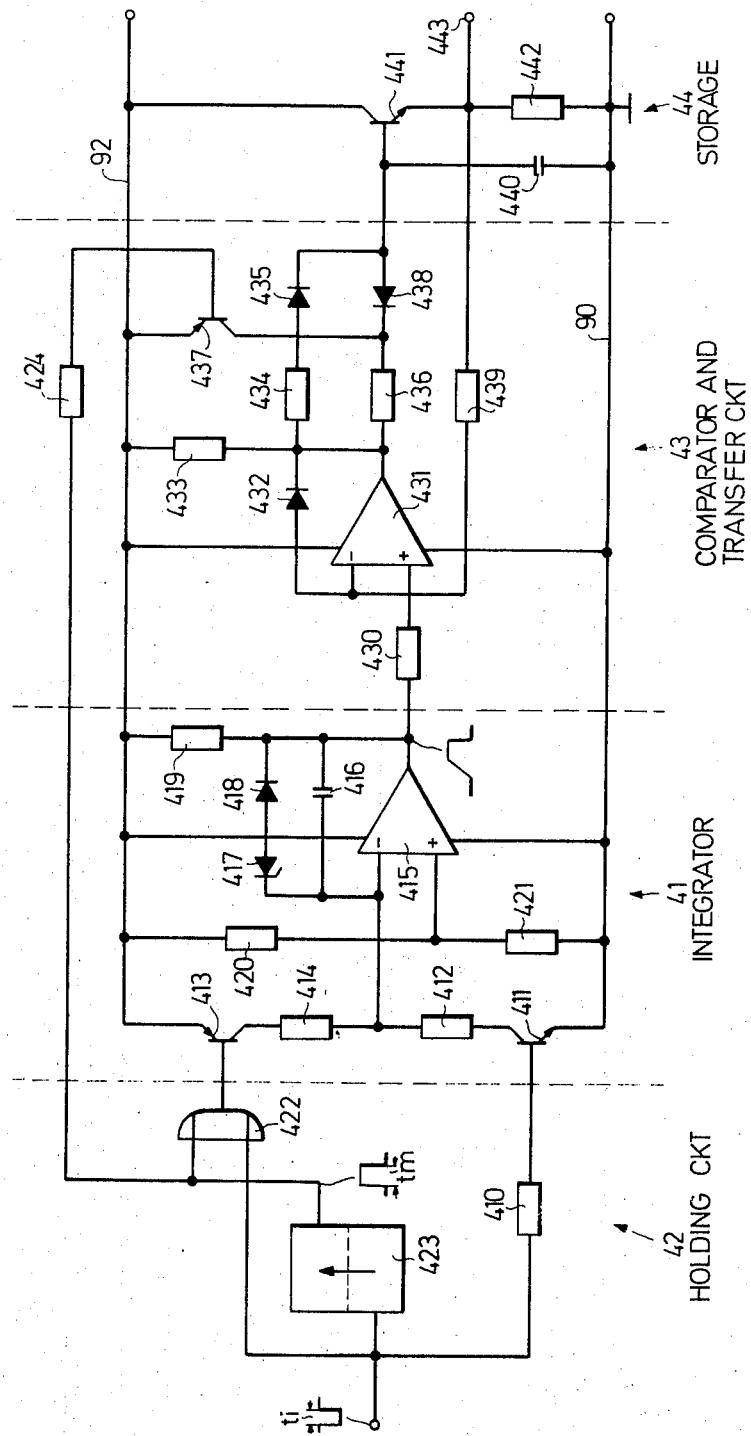
FIG. 8 is a schematic circuit diagram of a pulse time-voltage converter circuit.

FIG. 7 illustrates a circuit which is an alternative to that of FIG. 3, that is, to obtain an output signal which depends on loading of the engine. The load-dependent output signal, typically an output voltage, is derived from a fuel injection system, in which fuel injection pulses are provided having a time duration, and a time gap between the pulses, which together form a measure for the loading on the internal combustion engine, similar to the inlet manifold vacuum which forms the basis for the pressure-voltage transducer in accordance with FIG. 3. An integrator 41 is connected to the output of the fuel injection system, and receives pulses having pulse duration ti. The integrated output is connected to a comparator and transfer circuit 42. The pulses are further connected to a holding circuit 42 which is likewise connected to the comparator 43. A storage circuit 44 is connected to the output of the comparator and transfer circuit; the output from the storage circuit 44 is likewise connected back to the transfer circuit. The details of the circuit of FIG. 7 are illustrated in FIG. 8.

The separate, subsequent fuel injection pulses of time duration ti are connected over base resistor 410 (FIG. 8) to the base of a first npn transistor 411. They are also connected to one input of an OR-gate 422 and to a monostable multivibrator (MV) 423. The output of the monostable MV 423 is connected to the second input of the OR-gate 422. OR-gate 422 and MV 423 form the holding circuit 42 (FIG. 7).

The emitter of the first npn transistor 411 is connected to chassis bus 90. The collector of transistor 411 is connected over input resistor 412 to the inverting input of a first operational amplifier 415, and further over a discharge resistor 414 to the collector of the first pnp transistor 413. The emitter of pnp transistor 413 is connected to bus 92. Its base is connected to OR-gate 422. The non-inverting input of operational amplifier 415 is connected to a reference voltage, that is, to the tap point of a voltage divider formed of resistors 420, 421 connected between buses 90, 92. The output of the first operational amplifier 415 is connected to bus 92 over output resistor 419. It is connected additionally by means of integrating capacitor 416 to the inverting input. The series circuit of a Zener diode 417, and a first diode 418, with both anodes connected, is connected in parallel to feedback capacitor 416. The integrator 41 is formed by the operational amplifier 415, transistors 411, 413, and the components having reference numerals 410 to 421.

The output of the first operational amplifier 415, that is, the integrator 41, is connected over coupling resistor 430 to the non-inverting input of a second operational amplifier 431. Second operational amplifier 431 forms the central unit of the comparator and transfer circuit 43. The two operational amplifiers 415, 431 are connected to supply potentials by being connected to buses 92 and 90. The output of the second operational amplifier 431 is connected to a second diode 432, which feeds back to the inverting input, with the cathode being connected to the output. Output resistor 433 connects to bus 92. The output is further connected to a coupling resistor 434, series connected to a diode 435 and to a further coupling resistor 436. A second pnp transistor 437 has its collector connected to the other terminal of output coupling resistor 436. The emitter of transistor 437 is connected to bus 92. The base of transistor 437 is connected by coupling resistor 424 to the output of monostable MV423, and thus to the holding circuit 42. A diode 438 connects to the junction of the collector connection of transistor 437 and resistor 436. The other terminal, the anode, of the fourth diode 438, is connected to the cathode of the third diode 435. The cathode of the third diode 435 and the anode of the fourth diode 438 together form the output of the comparator and transfer circuit 43. This output is connected to the base of a second npn transistor 441. A storage capacitor 440 connects the base of transistor 441 and chassis bus 90. The collector of the second npn transistor 441 is connected directly to bus 92; the emitter is connected over emitter resistor 442 to chassis.

The emitter of the second npn transistor 441 additionally forms the output 443 of the pulse time converter and is connected over second resistor 439 with the inverting input of the second operational amplifier 431.

Operation of circuit of FIGS. 7 and 8: Upon occurrence of an injection pulse of duration ti, the base resistor 410 of the first npn transistor 411 becomes conductive. Simultaneously, the pulse is transferred to OR-gate 422 which causes blocking of transistor 413. Dependent on the values of input resistor 412 and integration capacitor 416, which causes the first operational amplifier 415 to operate as an integrator, an integration process will start. At the end of the time duration ti of an input pulse, the output voltage of the first operational amplifier 415, and thus of integrator 41 is proportional to the time ti. The turn-off flank of the injection pulse will set the monostable MV 423 which then will remain for a pulse period tm in its unstable state. During the pulse duration tm, first pnp transistor 413 remains blocked, by transfer of the pulse over OR-gate 422. The first npn transistor 411 will become blocked since the input pulse of duration ti has disappeared. Thus, the output voltage delivered by the first operational amplifier will not change and this voltage will be stored for the time period tm, that is, the unstable time of the monostable MV 423.

The integration voltage available at the output of the first operational amplifier is scanned, or applied by the coupling resistor 430, of the second operational amplifier 431. It is compared in operational amplifier 431 with the voltage derived from the output 443 of the pulse voltage transfer circuit, as fed back by the second coupling resistor 439. In effect, the output voltage of integrator 41 is compared with the output voltage previously available at the circuit 44. If the fed back output voltage has a lesser value than the integrator voltage, second operational amplifier 431 charges capacitor 440 over the coupling resistor 434 and the third diode 435, until there is equality of voltage at the inputs of the second operational amplifier 431. If, however, during the pulse period tm the previous output voltage at terminal 443 is higher than the voltage at the output of integrator 441, then the second operational amplifier 431 will have a lesser output voltage applied, that is, fourth diode 438 and second coupling resistor 436 will cause discharge of capacitor 440 until there is equality of voltages at the inputs of the second operational amplifier 431. Again, the voltage at output terminal 443 is fed back over resistor 439.

During the pulse period tm, second pnp transistor 437 is blocked due to connection of its base with the monostable MV 423 of the second resistor 424. After the pulse time tm, second pnp transistor 437 becomes conductive, causing the fourth diode 438 to block. Until a new cycle starts, that is, until a new resetting of monostable MV 423, no further discharge of capacitor 440 can result. Simultaneously, as the monostable MV 423 resets, the first pnp transistor 413 becomes conductive at the end of the pulse time tm. The integration capacitor 416 can discharge over discharge resistor 414 and first pnp transistor 413. Simultaneously, the output of the first operational amplifier 415 is dropped to a lower voltage level. The feedback circuit including Zener diode 417 and first diode 418, in parallel to the integration capacitor 416, prevents drop of the output voltage of the first operational amplifier 415 below a predetermined threshold level. This threshold is used for the next integration cycle, that is, as a starting point for the integration determined by the time period of the next pulse of time duration ti.

The second diode 432 is used to stabilize operation of the second operational amplifier 431. The situation may occur that the non-inverting input of the second operational amplifier 431 will have a lower voltage level applied over the resistor 430 than the output fed back over resistor 439 from the output terminal 443, to the inverting input of the operational amplifier. It is necessary to maintain the second operational amplifier 431 in its active operating range and to prevent storage effects in the amplifier input circuit by polarity reversal, and thus arising delay times upon a subsequent application of voltage from integrator 41. Diode 433 is provided to bridge the second operational amplifier 431 so that the inverting amplification input can have as much current drain therefrom as is supplied by the coupling resistor 439.

The circuit of FIGS. 7 and 8 is particularly useful to provide a load-dependent voltage when the internal combustion engine is electronically controlled, in connection with a central electronic network used for operation and control of the internal combustion engine, since a load-dependence signal for various operational controls may be desired.

Control of the ignition timing, as described, was based on voltage control. It is equally possible to compare currents. The elements 17, 21 and 35 of FIG. 1 can then be replaced by alternative components which are current sensitive, rather than voltage sensitive.

Referring to FIG. 9, the alternative circuit which provides current control shows a D/A converter 57 and a current comparator 65, which take the place of summing circuit 35 and comparator 21. D/A converter 57 has three switching stages, controlled by binary counter 15, and using npn switching transistors 571 as switches with binary valued resistors 572, 573, 574. Resistors 572, 573, 574, of progressive value in accordance with the binary system, have switching transistors 571 connected thereto. The terminals remote from switching transistors 571 of the resistors 572 are combined and connected, together, to the inverting input of a first operational amplifier 655. The D/A converter 57, in a preferred embodiment, as shown, has as many switching stages as angular positions to change the ignition timing to be selected, that is, the number of stages will depend on the angular width of the ignition timing, as well as on the resolution. It is equally possible to utilize the resistance network of the D/A converter 17 connected in advance of the operational amplifier 175 (FIG. 2) rather than the circuit 57 of FIG. 9.

Current comparator 65, as well as summing circuit 35 has a first input 651 and a second input 652. If additional input parameters are to be used to control the ignition timing, further inputs can be connected similarly to terminals 651, 652. Each one of these inputs has an input resistor connected thereto. Thus, input 651 has input resistor 653 connected in series and to the inverting terminal of operational amplifier 655; input terminal 652 has an input resistor 654 connected in series therewith. The first input resistance 653, or all input resistors of the first group of input terminals (collectively shown as 651), by connection to the inverting input of the first operational amplifier 655, form, at the inverting input, a first current summing point, together with the output of the D/A converter 57, or a resistance network in accordance with FIG. 2. Adjustable resistor 657 connects the inverting input of the first operational amplifier 655 with the supply bus 92. The non-inverting input of the first operational amplifier 655 is connected to a reference voltage by being connected to the tap point of a voltage divider formed of resistors 663, 665, connected between buses 92, 90. The output of the first operational amplifier 655 forms the output of current comparator 65.

The second input 652 is connected over input resistor 654 with the inverting input of a second operational amplifier 656. As noted before in connection with first operational amplifier 655, further inputs can be connected over further input resistors to the current summing point formed by the inverting input of the second operational amplifier 656. The non-inverting input of second operational amplifier 656 has a reference voltage applied thereto which is determined by the tap point of a voltage divider connected between buses 90, 92 and comprising two series connected resistors 664, 666. The output of the second operational amplifier 656 is connected to feedback resistor 660 and to the inverting input. Coupling resistor 662 connects the output of operational amplifier 656 to the current summing point or junction formed by the inverting input of first operational amplifier 655.

Operation of circuit in accordance with FIG. 9: The inverting input of the operational amplifier 655 functions as a current summing point; the non-inverting input has a fixed voltage applied thereto, which determines whether the current flowing over the adjustable resistor 657 and the output resistor 662 is greater or smaller than the current being supplied by the network of the D/A converter 57 and the input resistor 653 (or further connections which supply, or drain current). Initially, the adjustable resistor 657 will supply a predetermined current to the summing point. If from the summing point no current is drained, then the first operational amplifier will accept the current which will provide at its output a voltage which is close to the voltage of ground or chassis bus 50. As as soon as a start pulse is derived from the transducer 10, (FIG. 1), and the binary counter 15 counts counting pulses, D/A converter 57 will drain increasing current from the draining point until, finally, the draining current becomes greater than the current being supplied. At that instant, operational amplifier 655 will switch over and the output 668 will have positive voltage thereat. This transfer effects the set of the first bistable FF 23 (FIG. 1). Current may be drained by the D/A converter 57. Additional current drains or supplies arise due to the presence of the input resistor 653 connected to input 651, and further input resistors, and further inputs, which are connected to function generators, for example in accordance with FIG. 4, to advance ignition timing. This additional current, thus, has the effect that the previously described balance of currents, causing switch-over of the first operational amplifier and thus set of the first FF 23 occurs earlier in time. In order to retard the spark, the second operational amplifier 656 is utilized as an inverting amplifier. The second input resistor 654, connected to the second input 652 and additionally connected inputs which drain current and which are controlled by function generators in accordance with FIG. 4, for example, and causing spark retardation, are likewise connected to the inverting input of the second operational amplifier 656. The effect is that output resistor 662 from operational amplifier 656 will supply additional current which will add to the current supplied by the adjustable resistor 657. To compensate these two increasing currents, a higher counter state of binary counter 15 is required before the operational amplifier 655 will switch over, thus delaying the ignition instant.

A signal proportional to loading, for example a voltage, or current, can be derived for example by measuring the quantity of air being supplied to the internal combustion engine for each stroke thereof. This requires an electronic division. As a result a value is obtained which can be used to control a function generator, for example in accordance with FIG. 4.

It may not be necessary to determine the instant of ignition for each cylinder of a multi-cylinder engine separately, that is, to control ignition timing conjointly for all the cylinders of a multi-cylinder engine, particularly for a higher number of cylinders. In such a case, it is suitable to relate the values which control ignition timing to one, or a few, representative cylinders, that is, to determine the instant of current interruption, and re-connection of ignition current accurately for one or more cylinders only, and utilizing this so derived timing for all the cylinders, by counting pulses for the other cylinders in accordance with a division ratio relating the number of cylinders to total crankshaft revolution. Thus, in an eight-cylinder engine, one representative cylinder in each of a bank of four may be selected to control the timing of the other cylinders in the bank, with due regard to the firing order of the cylinders.

Various changes and modifications may be made, and the embodiments described in connection with any one of the figures may be used with other embodiments of the invention, within the inventive concept.

We claim:

1. Ignition timing control system for internal combustion engine ignition systems comprising
pulse generator means (10) providing output pulses synchronized with engine rotation;
a control signal generation means (10, 27, 29; 31, 34; 35) providing a signal representative of engine operation, operating, or environmental parameters;
a binary counter (15) connected to the pulse generator means and counting in synchronism with engine rotation;
counter start means (108, 12, 13) connected to said pulse generator means (10) and generating a marker pulse representative of a predetermined angular position of the crankshaft, said counter start means being connected to said counter (15) to start a counting cycle thereof;
a comparator means (21) having one input connected to the output of the counter (15) and another input connected to the output of the control signal generation means to compare the timed occurrence of a predetermined pulse count with the value of the control signal and providing an output ignition pulse forming a start signal to initiate an ignition pulse in accordance with angular position of the crankshaft as determined by the count of the counter and the value of the control signal representative of said parameter;
means (23, 26) connected to said comparator means (21) and sensing occurrence of said start signal, and connected to reset said counter (15) upon sensing said start signal, said counter thereby starting a second count cycle;

and preset means connected to said counter and establishing a predetermined count number of said counter, said counter, when reaching said predetermined count number, providing a counter stop pulse forming a stop signal to terminate the ignition pulse.

2. System according to claim 1, wherein the output of the control signal generation means is a continuously variable analog signal;

and the system comprises a digital/analog converter (17) connected between the counter (15) and the one input of the comparator (21) to permit the comparator to compare analog values.

3. System according to claim 1, wherein the means to sense occurrence of the start signal comprises a bistable flip-flop (23) connected to the output of the comparator (21), the output of said flip-flop being applied to the ignition system to initiate the ignition pulse.

4. System according to claim 3 wherein the preset means comprises a decoder (19) connected to the counter (15) and providing a reset pulse to the flip-flop (23) to terminate the ignition pulse.

5. System according to claim 1, wherein the control signal generation means comprises means sensing engine speed and providing a speed dependent output signal;

means sensing loading of the engine and providing a load-dependent output signal;

and summing means (35) summing the speed and load dependent signals and applying a composite engine operation parameter signal to said comparator.

6. System according to claim 5, further comprising an additional control input (35') connected to the summing means (35) to apply additional engine operation, operating, or environmental parameters thereto.

7. System according to claim 5, wherein the comparator is a current comparator (65);

and the signals derived from the summing means and the binary counter are currents varying in magnitude and sign.

8. System according to claim 1, wherein the pulse generator means has a pulse train output (109) providing a pulse train representative of engine angular crankshaft position and a marker pulse output (108) forming said counter start means and providing a marker pulse representative of a predetermined angular crankshaft position.

9. System according to claim 8, wherein the counter (15) has a count input terminal (152) and a zero set and enabling terminal (151), the marker pulse output (108) being connected to the zero set and enabling terminal of the counter (15) and the pulse train output (109) being connected to the count input terminal (152) thereof.

10. System according to claim 9, wherein the control signal generation means comprises means (27, 28) providing a speed-dependent signal, said means being connected to the pulse train output (109) of the pulse generator (10).

11. System according to claim 10, wherein the control signal generation means further comprises means sensing loading on the engine and providing a load-dependent output signal;

and summing means (35) summing the speed-dependent signal derived from the pulse train output (109) of the pulse generator and the load-dependent signal, and applying a composite of said signals to the comparator.

12. System according to claim 9, wherein the counter start means further comprises a second flip-flop (12) having one terminal connected to the marker pulse output of the pulse generator (10) and its output connected to the zero set input (151) of the counter (15).

13. System according to claim 12, wherein the means to sense occurrence of the start signal comprises a bistable flip-flop (23) connected to the output of the comparator (21), the output of said flip-flop being applied to the ignition system and to initiate the ignition pulse;

and means (26) further connecting the output of said first flip-flop (23) to the reset terminal of the second flip-flop (12).

14. System according to claim 9, wherein the means to sense occurrence of the start signal comprises a bistable flip-flop (23) connected to the output of the comparator (21), the output of the flip-flop being applied to the ignition system to initiate the ignition pulse;

and means (26) connecting the output of the first flip-flop (23) to the zero set and enabling input (151) of the counter (15) to reset and enable counting after each ignition pulse and provide for the second count cycle by continued counting of the counter.

15. System according to claim 14, further comprising means (26) connecting the output of the first flip-flop (23) to the reset terminal of the second flip-flop 12;

and an OR-gate (13) connecting the output of the second flip-flop (12) and the means (26) connecting the output of the first flip-flop (23) to the zero set input of the counter.

16. System according to claim 1, wherein the preset means comprises a decoder (19) connected to the counter (15) and set to generate said counter stop pulse upon sensing that the decoded count state of the counter has reached said predetermined count number.

17. System according to claim 3, wherein the preset means (19) is connected to the flip-flop (23) and providing a reset pulse to terminate the ignition pulse.

* * * * *